(12) United States Patent
Artel et al.

(10) Patent No.: US 11,975,408 B2
(45) Date of Patent: May 7, 2024

(54) BUTT-JOINT DEEP PENETRATION LASER WELDING METHOD

(71) Applicant: SMS group GmbH, Düsseldorf (DE)

(72) Inventors: Jens Artel, Kirchhundem (DE); Sebastian Seegers, Niederkassel (DE); Christian Dornscheidt, Düsseldorf (DE); Lutz Kümmel, Jüchen (DE); Jens Szonn, Düsseldorf (DE)

(73) Assignee: SMS group GmbH, Düsseldorf (DE)

( * ) Notice: Subject to any disclaimer, the term of this patent is extended or adjusted under 35 U.S.C. 154(b) by 0 days.

(21) Appl. No.: 17/784,326

(22) PCT Filed: Dec. 18, 2020

(86) PCT No.: PCT/EP2020/086929
§ 371 (c)(1),
(2) Date: Jun. 10, 2022

(87) PCT Pub. No.: WO2021/123097
PCT Pub. Date: Jun. 24, 2021

(65) Prior Publication Data
US 2023/0049065 A1    Feb. 16, 2023

(30) Foreign Application Priority Data

Dec. 20, 2019 (DE) ...................... 10 2019 220 471.6
Dec. 17, 2020 (DE) ...................... 10 2020 216 163.1

(51) Int. Cl.
*B23K 26/211* (2014.01)
*B23K 26/32* (2014.01)
(Continued)

(52) U.S. Cl.
CPC ............ *B23K 26/211* (2015.10); *B23K 26/32* (2013.01); *B23K 35/0244* (2013.01);
(Continued)

(58) Field of Classification Search
CPC ............ B23K 2101/16; B23K 2101/18; B23K 2103/04; B23K 26/211; B23K 26/32;
(Continued)

(56) References Cited

U.S. PATENT DOCUMENTS 9,630,275 B2 * 4/2017 Chen .................... B23K 35/001
11,517,980 B2 * 12/2022 Li ........................ B23K 26/062
(Continued)

FOREIGN PATENT DOCUMENTS

CN    102639277 A    8/2012
CN    103476536 A    12/2013
(Continued)

OTHER PUBLICATIONS

Machine translation of DE-102018107291: Brugger, Process for welding coated steel sheets, 2019 (Year: 2019).*

*Primary Examiner* — Janie M Loeppke
*Assistant Examiner* — Abigail H Rhue
(74) *Attorney, Agent, or Firm* — Smartpat PLC

(57) ABSTRACT

A butt joint deep penetration laser welding method is used for joining facing end sections of flat steel products, each having a carbon content CS<0.02%. In order to improve such a method such that an improved weld quality in terms of geometry and strength is achievable with it, at least one carbon-containing carrier material is inserted into a butt joint gap between the end sections, the carbon content of which is $C_T \geq 20 \cdot C_S$, preferably $C_T \geq 100 \cdot C_S$, and/or carbon is inserted into the butt joint gap or applied to at least one end section, such that the volume of the carbon inserted into the butt joint gap corresponds to 1% to 20% of the volume of a melt produced by a butt joint deep penetration laser welding process.

12 Claims, 1 Drawing Sheet

(51) Int. Cl.
  *B23K 35/02*  (2006.01)
  *B23K 35/22*  (2006.01)
  *B23K 101/16*  (2006.01)
  *B23K 101/18*  (2006.01)
  *B23K 103/04*  (2006.01)

(52) U.S. Cl.
  CPC .......... *B23K 35/0261* (2013.01); *B23K 35/22* (2013.01); *B23K 2101/16* (2018.08); *B23K 2101/18* (2018.08); *B23K 2103/04* (2018.08)

(58) Field of Classification Search
  CPC ............ B23K 35/0244; B23K 35/0261; B23K 35/22; C22C 38/004
  See application file for complete search history.

(56) References Cited

U.S. PATENT DOCUMENTS

| | | | |
|---|---|---|---|
| 2012/0241420 A1* | 9/2012 | Ishikawa | B23K 15/0073 219/121.13 |
| 2012/0298637 A1 | 11/2012 | Sakkinen et al. | |
| 2013/0236239 A1 | 9/2013 | Brandt et al. | |
| 2014/0124481 A1 | 5/2014 | Yano et al. | |
| 2017/0304952 A1 | 10/2017 | Cretteur et al. | |
| 2019/0126402 A1* | 5/2019 | Yang | B23K 26/044 |
| 2020/0189035 A1 | 6/2020 | Heydt et al. | |
| 2021/0008665 A1 | 1/2021 | Brugger | |
| 2022/0072658 A1 | 3/2022 | Schmit et al. | |

FOREIGN PATENT DOCUMENTS

| | | | | |
|---|---|---|---|---|
| CN | 106735900 A | 5/2017 | | |
| CN | 109420846 A | 3/2019 | | |
| DE | 102010019258 A1 | 11/2011 | | |
| DE | 102017120611 A1 | 3/2019 | | |
| DE | 102018107291 A1 * | 10/2019 | ............ | B21D 22/02 |
| DE | 102018107291 A1 | 10/2019 | | |
| EP | 2736672 A1 | 1/2013 | | |
| JP | H0741841 A | 2/1995 | | |
| JP | H11147191 A | 6/1999 | | |
| JP | 2000301205 A | 10/2000 | | |
| JP | 2002180181 A | 6/2002 | | |
| JP | 2002316283 A | 10/2002 | | |
| JP | 2002321088 A | 11/2002 | | |
| JP | 2004136329 A | 5/2004 | | |
| JP | 2008264839 A | 11/2008 | | |
| JP | 2010105045 A | 5/2010 | | |
| JP | 2010214402 A | 9/2010 | | |
| JP | 2013176809 A | 9/2013 | | |
| WO | 2020136585 A1 | 7/2020 | | |

* cited by examiner

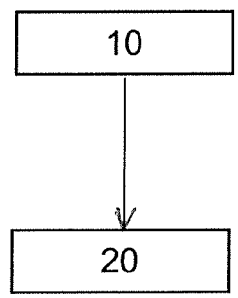

BUTT-JOINT DEEP PENETRATION LASER WELDING METHOD

TECHNICAL FIELD

The disclosure relates to a butt joint deep penetration laser welding method for joining facing end sections of flat steel products, each having a carbon content $C_S<0.02\%$.

BACKGROUND

Welding of ULC steel grades with a solid-state laser is characterized by a highly unstable weld pool with severe sagging of the seam root. This effect is not known from welding structural steels or higher-alloy steels.

Currently, workpiece sections, such as two metal strip ends, are first preheated to over 500° C. and then welded at a slow feed rate. ULC steel grades can be easily welded with higher-alloy steel grades, which can be achieved in the region of coil joints in strip processing lines by appropriate production planning.

The preceding solution brings only a slight improvement in terms of seam geometry and seam strength, but, in principle, is sufficient for the application. The disadvantage is the slow welding speed and the associated loss of productivity. In addition, the high preheating temperature places a high thermal load on the equipment, which reduces the service life of some components. In addition, the process window for carrying out the welding process is relatively small, such that reproducible seam quality is not present. In strip processing lines, the problem can be circumvented by adapted production planning, which is usually rejected by customers in the steel industry.

DE 10 2018 107 291 A1 relates to a method for welding steel sheets made of steel materials coated with an aluminum-silicon corrosion protection layer, wherein a filler wire is used when welding the sheets.

EP 2 736 672 B1 relates to a method of manufacturing a welded steel part, wherein a first steel sheet and a second steel sheet are welded together.

DE 10 2017 120 611 A1 relates to a method for fusion welding one or more steel sheets of press-hardenable steel, with which fusion welding is carried out by feeding filler wire into the molten pool generated exclusively by means of a laser beam.

WO 2020/136 585 A1 relates to a method for producing a welded steel blank, wherein two pre-coated plates are joined together by butt welding using a filler wire.

SUMMARY

One object of the disclosure is to optimize a butt joint deep penetration laser welding method of the type described above in such a manner that it can be used to achieve improved weld seam quality in terms of geometry and strength.

This task is achieved by the method as claimed in the independent claim. Advantageous embodiments are reproduced in the following description, the dependent patent claims and the FIG.

In accordance with a butt joint deep penetration laser welding method for joining facing end sections of flat steel products, each having a carbon content $C_S<0.02\%$, at least one carbon-containing carrier material is inserted into a butt joint gap between the end sections or is applied to at least one end section, the carbon content of which is $C_T \geq 20 \cdot C_S$, preferably $C_T \geq 100 \cdot C_S$, and/or carbon is inserted into the butt joint gap or applied to at least one end section, such that the volume of the carbon inserted into the butt joint gap corresponds to 1% to 20% of the volume of a melt produced by a butt joint deep penetration laser welding process.

The butt joint deep penetration laser welding method in accordance with the invention allows flat steel products, for example metal strips or sheets, made of ULC steel (ULC, IF) with a carbon content $C_S<0.02\%$, in particular $C_S<0.01\%$, to be welded together by welding the facing end sections of the flat steel products together by means of laser radiation in the course of a deep penetration welding process to form a butt joint connection in order to produce a weld seam of improved quality in terms of geometry and strength. In this connection, in accordance with the invention, carbon is inserted into the butt joint gap between the end sections or applied to at least one end section of a flat steel product via the carrier material or in pure form in such a quantity prior to carrying out the deep penetration welding process and/or during the carrying out of the deep penetration welding process that, as tests have already shown, the deep penetration welding process is steadied to such an extent that the method can realize a welding speed, a welding power and a stable process window for the welding process that are comparatively known from the welding of structural steels and higher-alloy ferritic steels. In addition, a significantly improved weld seam geometry can be produced with the method or the associated insertion of a sufficient amount of carbon into the deep penetration welding process. The strength of the welded joint produced by the method in accordance with the invention is more than sufficient, in particular for the production of coil joints or of strip ends of metal strips coiled or coilable into coils in strip processing lines. Due to the higher welding speeds that can be realized with the method, shortened cycle times are also possible, which increases productivity.

Preferably, the method in accordance with the invention is carried out in such a way that the carrier material is largely or completely vaporized during the carrying out of the deep penetration welding process, in order to create a joint between the flat steel products whose mechanical and/or chemical properties substantially correspond to the mechanical and/or chemical properties of the flat steel products. In the ideal case, the carbon content in the welded microstructure is so low that inhomogeneities in the microstructure and in strength properties are kept to a minimum.

The flat steel products weldable by the method can have such a low carbon content that the flat steel products are virtually pure iron. The insertion of a sufficient amount of carbon into the butt joint gap or the application of a sufficient amount of carbon to at least one end section of a flat steel product increases the carbon content of the melt formed with the laser radiation to suitable values, specifically to at least twenty times the carbon content of the flat steel products when the carbon-containing carrier material is used.

In accordance with the method, carbon is thus inserted in high quantity into the butt joint or applied to at least one end section of a flat steel product, as the case may be. The invention is intended to cover any type of insertion or application, as the case may be, of carbon that is suitable for this purpose.

The carbon-containing carrier material or carbon, as the case may be, can be inserted into the butt joint gap in particular by applying the carrier material or carbon, as the case may be, to only one of the two opposing joining surfaces of the end sections of the flat steel products or by applying the carrier material or carbon, as the case may be, to both joining surfaces.

If carbon is inserted into the butt joint gap or applied to at least one end section in such a way that the volume of carbon inserted into the butt joint gap corresponds to 1% to 20% of the volume of the melt produced by the butt joint deep penetration laser welding process, pure carbon, in particular in the form of graphite, can be used, for example.

In laser deep penetration welding, the material is processed with very high beam intensities. In contrast to heat conduction welding, metal vapor is also produced in addition to the metal melt, which partially displaces the melt and leads to the formation of a vapor capillary (keyhole). Laser deep penetration welding is characterized by a high process speed. The heat-affected zone is always narrowly limited in laser deep penetration welding and material distortion is correspondingly low. What remains is a narrow, uniformly structured weld seam whose depth dimension is often greater than its width. Laser deep penetration welding can take the form of through-welding, wherein the laser beam exits the butt joint gap again at a lower edge of the respective flat steel product that is arranged in a manner facing away from the laser radiation source. In this connection, a seam root can be produced.

Within the framework of the disclosure, a flat steel product can be a steel sheet or a steel strip that can be wound into a coil. The respective flat steel product can have a thickness in the range of 0.5 mm to 10 mm, since flat steel products with a thickness in this range can be optimally joined by means of the method.

In accordance with an advantageous embodiment, a solid-state laser is used as the laser beam source. The solid-state laser is sufficiently robust and compact for use in accordance with the disclosure.

In accordance with a further advantageous embodiment, a fiber laser or a disk laser or a diode laser is used as the laser beam source.

According to a further advantageous embodiment, laser radiation with a wavelength in a range of 980 nm to 1120 nm is used. The deep penetration welding process can be kept very stable in the specified wavelength range because of the insertion of a large amount of carbon into the butt joint gap or the application of a large amount of carbon to at least one end section of a flat steel product, as the case may be, which is not possible in this wavelength range with conventional methods, for example using a carbon dioxide laser to generate laser radiation, when welding ULC steel grades with a carbon content of $C_S$<0.02%.

According to a further advantageous embodiment, a welding speed in a range of 1 m/min to 10 m/min, preferably in a range of 4 m/min to 10 m/min, more preferably in a range of 7 m/min to 10 m/min, is used.

In accordance with a further advantageous embodiment, a metallic powder is used as the carrier material. The metallic powder is to be selected with a suitably high carbon content in relation to the carbon content of the flat steel products. The metallic powder can be actively or passively applied to the joining surface at the end of a cutting process, by which a part of the respective flat steel product is cut off to form a joining surface on the flat steel product, and before the joining process or welding process, wherein the respective metallic powder can adhere to the joining surface using adhesion forces or electrostatic forces. The metallic powder can have graphite as the carbon component.

In accordance with a further advantageous embodiment, a graphite-containing metallic foil is used as the carrier material. The foil constitutes the carrier material and has a suitably high carbon content. The foil can be applied to the respective joining surface at the end of the cutting process described above, for example in the form of an adhesive tape.

In accordance with a further advantageous embodiment, a fluid containing graphite is used as the carrier material. The fluid constitutes the carrier material and has a suitably high carbon content. The fluid is preferably designed to dry quickly. The fluid can be applied to the respective joining surface at the end of the cutting process described above. For example, the fluid can be a liquid or a viscous paste.

In accordance with a further advantageous embodiment, the fluid is actively dried after its insertion into the butt joint gap. The active drying of the fluid can be accomplished, for example, using induction or induction heat or UV radiation, or by active heating, such as by a flame or the like.

In accordance with a further advantageous embodiment, a flux-cored wire or a sheet is used as the carrier material. The flux-cored wire or the sheet, as the case may be, constitutes the carrier material and has a suitably high carbon content. The flux-cored wire can also be referred to as welding wire.

According to a further advantageous embodiment, the carrier material is applied to an abutting surface of at least one end section prior to use of the laser radiation, after which the butt joint gap is closed.

In the following, the invention is described by way of example with reference to the accompanying FIG. based on a preferred embodiment. The features explained below can be present individually and in combination of at least two of such features with one another.

BRIEF DESCRIPTION OF THE DRAWINGS

FIG. 1 is a block diagram of an exemplary embodiment of a butt joint deep penetration laser welding method.

DETAILED DESCRIPTION

FIG. 1 shows a block diagram of an exemplary embodiment of a butt joint deep penetration laser welding method for joining facing end sections of flat steel products, each having a carbon content $C_S$<0.02%.

In method step 10, a carbon-containing carrier material is inserted into a butt joint gap between facing end section of flat steel products or applied to at least one end section. A carbon content of the carrier material is $C_T \geq 20 \cdot C_S$, preferably $C_T \geq 100 \cdot C_S$, wherein $C_S$ is the carbon content of at least that flat steel product having the higher carbon content. In addition or alternatively, in method step 10, carbon is inserted into the butt joint gap or applied to at least one end section such that the volume of the carbon inserted into the butt joint gap corresponds to 1% to 20% of a volume of a melt produced by a butt joint deep penetration laser welding method.

The carrier material or the carbon, in particular pure carbon, is applied to an abutting surface of at least one end section in method step 16, prior to the use of the laser radiation in method step 20, after which the butt joint gap is closed. A metallic powder can be used as the carrier material. Alternatively, a graphite-containing metallic foil can be used as the carrier material. Alternatively, a fluid containing graphite can be used as the carrier material, which can be actively dried after its insertion into the butt joint gap. Alternatively, a flux-cored wire or a sheet can be used as the carrier material.

In method step 20, laser radiation is generated and directed to the butt joint gap into which the carbon-containing carrier material or carbon has been inserted, such that a butt joint deep penetration laser welding process can be carried out. In doing so, a solid-state laser is used as the laser beam source. In particular, a fiber laser or a disk laser or a diode laser can be used as the laser beam source. Laser radiation is generated and used with a wavelength in a range of 980 nm to 1120 nm. The laser deep penetration welding process carried out in method step 20 is carried out at a welding speed in a range of 1 m/min to 10 m/min.

LIST OF REFERENCE SIGNS

10 Method step (insertion of carrier material)
20 Method step (laser deep penetration welding process)

The invention claimed is:

1. A method, comprising
   butt joint deep penetration laser welding of joining facing end sections of flat steel products, each having a carbon content $C_s$<0.02%, and at least one of:
   inserting a carbon-containing carrier material into a butt joint gap between the end sections or applying a carbon-containing carrier material to at least one end section, a carbon content of the carrier material being $C_T$>20·$C_s$ with $C_s$ being the carbon content of the flat steel product having a larger carbon content, and
   inserting carbon into the butt joint gap or applying carbon to at least one of the end sections, such that a volume of the carbon inserted into the butt joint gap corresponds to 1% to 20% of a volume of a melt produced while joining the end sections during deep penetration laser welding.

2. The method as in claim 1, wherein the carbon content of the carrier material is $C_T$>100$C_s$.

3. The butt joint deep penetration laser welding method according to claim 1, wherein a solid-state laser is used as a laser beam source.

4. The butt joint deep penetration laser welding method according to claim 3,
   wherein a fiber laser or a disk laser or a diode laser is used as the laser beam source.

5. The butt joint deep penetration laser welding method according to claim 3,
   wherein the solid-state laser has a wavelength in a range of 980 nm to 1120 nm.

6. The butt joint deep penetration laser welding method according to claim 3,
   wherein the solid-state laser operates at a welding speed in a range of 1 m/min to 10 m/min.

7. The butt joint deep penetration laser welding method according to claim 1,
   wherein the carrier material is a metallic powder.

8. The butt joint deep penetration laser welding method according to claim 1,
   wherein the carrier material is a graphite-containing metallic foil.

9. The butt joint deep penetration laser welding method according to claim 1, wherein the carrier material is a graphite-containing fluid.

10. The butt joint deep penetration laser welding method according to claim 9, further comprising actively drying the fluid after its insertion into the butt joint gap.

11. The butt joint deep penetration laser welding method according to claim 1, wherein the carrier material is a fluxed cored wire or a sheet.

12. The butt joint deep penetration laser welding method according to claim 1, wherein the carrier material is applied to an abutting surface of at least one of the end sections prior to applying laser radiation, after which the butt joint gap is closed.

* * * * *